Nov. 18, 1952          J. B. HINKLE          2,618,092

LURE OR BAIT

Filed March 30, 1949

INVENTOR.
JOSEPH B. HINKLE

BY *Dybvig & Dybvig*

HIS ATTORNEYS

Patented Nov. 18, 1952

2,618,092

UNITED STATES PATENT OFFICE 2,618,092

LURE OR BAIT

Joseph B. Hinkle, Louisville, Ky.

Application March 30, 1949, Serial No. 84,331

1 Claim. (Cl. 43—42.15)

This invention relates to an artificial fish bait or lure and more particularly to a fish lure simulating an amphibian, such as a lizard.

An object of this invention is to provide a bait that is articulated, so as to have a movement in the water simulating a live bait, the hooks being so suspended that they simulate the legs of the amphibian.

Another object of this invention is to provide a bait so constructed and arranged that the hollow body parts, which may be made from plastic or any other suitable material, are linked together by metallic members, some of which in addition to functioning as links, also function as coupling units for attaching the line to the bait and other links for connecting the body portions together and to one or more of the hooks.

Another object of this invention is to provide a lure or artificial bait that simulates an amphibian, both in appearance and in its movement through the water, which bait is easily manufactured and at the same time neat and attractive in appearance.

Another object of this invention is to provide an artificial bait or lure wherein the main body portions are formed from hollow plastic parts held together by metallic links, the metallic parts holding the several portions of the main body together being jointed so as to provide an articulated assembly, the hooks also being attached to the bait or lure by metallic parts.

Other objects and advantages reside in the construction of parts, the combination thereof and the mode of operation, as will become more apparent from the following description.

Referring to the drawings.

Figure 1:
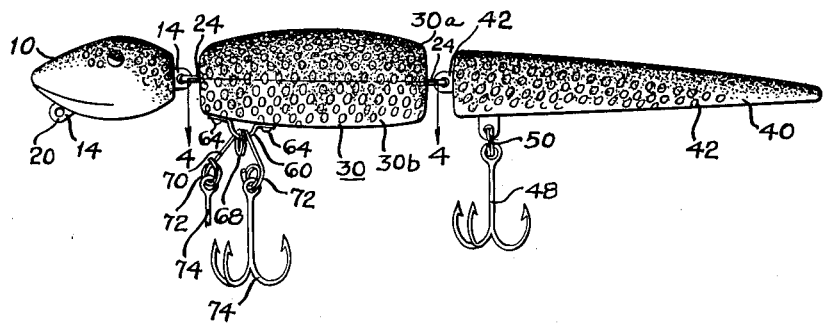
Figure 1 is a side elevational view of an artificial bait or lure.

In the drawings, the reference character 10 indicates a head of an artificial lure, which head is made from two hollow halves 10a and 10b joined along a vertical plane represented by line 12. A metalic link 14 is positioned between the two parts 10a and 10b. Link member 14 is provided with a pair of arms or projections 16 and another pair of arms or projections 18. Members 10a and 10b are hollow or provided with cavities through which the link 14 extends. The projections 16 are seated against the inside wall portion located near the front and under members 10a and 10b. The arms or projections 18 engage the inside wall of the rear portion of the hollow, which might be referred to as the base of the head.

The forward end of the link 14 is provided with an aperture 20 adapted to receive the fish line. The rear end of the link 14 is provided with an aperture 22 receiving a U-shaped dog or link 24.

The legs of the U-shaped dog or link 24 are deflected at right angles, so as to form anchoring portions 26, anchored in the lower half of the body portion 30.

Figure 3:
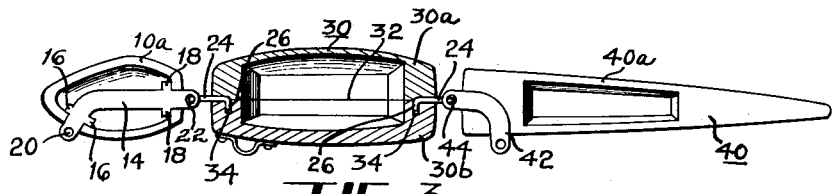
Figure 3 is a longitudinal cross sectional view, taken substantially on the line 3—3 of Figure 2.
Figure 4:
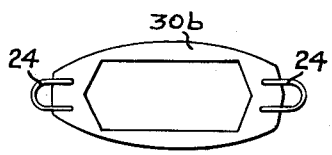
Figure 4 is a fragmentary cross sectional view taken substantially on the line 4—4 of Figure 1.
Figure 5:
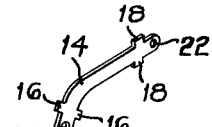
Figure 5 is a perspective view of the link extending through the head and used in connecting the line to the main body portion of the bait or lure.
Figure 6:
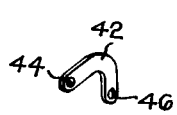
Figure 6 is a perspective view of a link used in attaching the rear hook and the tail to the main body portion.
Figure 7:
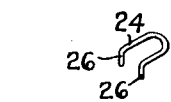
Figure 7 is a perspective view of a staple-like connecting member or dog.
Figure 8:
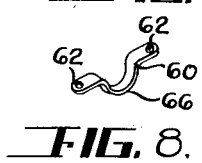
Figure 8 is a perspective view of a hook-supporting hanger.

The body portion 30 is made from two halves 30a and 30b joined along the line 32. The portions 30a and 30b are hollow, so as to reduce the weight thereof, as clearly shown in Figures 3 and 4. The anchoring portions 26, as best seen in Figure 3, are seated in apertures 34, positioned near the ends of 30b, there being one link or dog 24 linking the aperture 22 in the link member 14 and a link or dog 24, located in the rear of the body portion, for attaching the tail 40 to the main body 30.

Figure 2:
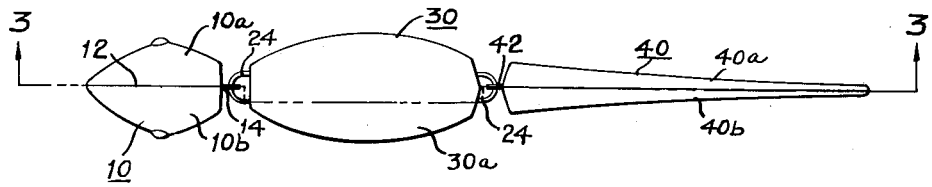
Figure 2 is a top plan view of the bait or lure shown in Figure 1, the decorative features of the lure being omitted from Figure 2.

The tail 40 is made from two hollow halves 40a and 40b, to reduce the weight. As can readily be seen by referring to Figures 1, 2 and 3, the tail tapers, so as to simulate the tail of a lizard.

A bell crank shaped link 42 is seated and fixedly secured between the halves of the tail 40a and 40b. The forward end of the link 42 is provided with an aperture 44 receiving the link 24. The other end of the bell crank shaped link 42 projects downwardly from the tail and is provided with an aperture 46. A hook 48 is attached by means of a suitable link 50 to the lower end of the bell crank link 42, so that the hook 48 is connected by metallic links directly to the main body portion 30.

Hook-supporting means are attached to the under side of the main body portion. This hook-supporting means includes a hanger bar 60, provided with a pair of apertures 62, one on either end of member 60. Suitable fastening brads or screws 64 are used in securing member 60 in position on the under side of the body portion 30b. Member 60 is provided with a loop-like portion 66, the bight of which supports coils 68 of a hook-supporting wire-like cross bar 70, terminating in loops or eyes 72, one on either side of the main body portion. The loops or eyes 72 support fishhooks 74. The cross bar 70 is transversely disposed with respect to the longitudinal axis of the bait. In the particular embodiment shown, three-pronged fishhooks have been used.

By supporting the fishhooks 74 on the ends of member 70, these fishhooks dangle downwardly and rearwardly from the main body portion, so as to simulate the legs of a lizard. Furthermore, by providing the pivotal support for the links 70, it can readily be seen that the ends of the links 70 may operate forward and aft, so that the hooks, together with the support therefor have a movement simulating the movement of the legs of a lizard swimming through water.

The halves 10a and 10b may be molded from tenite or any other suitable molding material. The link 14 may be laid in slots in the molded parts or link member 14 may be molded in situ to one of the parts. The halves 10a and 10b and 14 are secured together by suitable adhesive material or cement, rigidly holding the parts together and sealing all joints. Likewise, the body members 30a and 30b are secured together by suitable adhesive or cement, forming a seal, completely sealing the joints between the parts. Also, the tail members 40a and 40b are secured together in a similar manner.

Instead of using adhesive or cement, the parts may be secured together by applying a solvent to the surfaces to be joined, causing the adjoining surfaces to soften so that when pressed together they form a homogeneous unit. If, for example, the parts are made from nitrocellulose material, a solvent consisting of 60% acetone, 25% isopropyl acetate and 15% anhydrous isopropanol, could be applied to the adjoining surfaces so as to soften the surfaces, then press the two together so as to form a homogeneous unit. The type of solvent used depends upon the type of molding material used.

By painting or tinting the body of the lizard, so as to have ringlets, the artificial lure has the appearance of a lizard.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claim.

Having thus described my invention, I claim:

In an articulated bait or lure having an articulated body consisting of a head portion, a body portion and a tail portion connected together by flexible connecting means, the portions being spaced sufficiently far apart so as to permit relative movement thereof both horizontally and vertically, the head portion consisting of two hollow halves joined together on a vertical seam, and the body portion consisting of two halves joined together on a horizontal seam, said connecting means being characterized by a U-shaped member having a bight projecting forwardly from the body portion and a link located between the hollow halves of the head portion, said link having an aperture in the rear end through which the bight of the U-shaped member extends, the forward end of the link having another aperture located beyond the halves, the link being provided with two pairs of oppositely disposed projections seated against the inner wall of the hollow halves to rigidly hold the link in position with respect to the halves, the aperture in the forward end of the link being used to attach the bait or lure to a fish line.

JOSEPH B. HINKLE.

REFERENCES CITED

The following references are of record in the file of this patent:

UNITED STATES PATENTS

| Number | Name | Date |
|---|---|---|
| 152,648 | Kendrick | June 30, 1874 |
| 341,932 | McIntosh | May 18, 1886 |
| 857,883 | Kreisser | June 25, 1907 |
| 1,608,375 | Dewey | Nov. 23, 1926 |
| 1,610,029 | Wyrill | Dec. 7, 1926 |
| 1,955,408 | Chapleau et al. | Apr. 17, 1934 |
| 2,008,437 | DeWitt | July 16, 1935 |
| 2,069,972 | Schroeder | Feb. 9, 1937 |
| 2,123,951 | McArthur | July 19, 1938 |

OTHER REFERENCES

Publication: Fur-Fish-Game, Harding's Magazine, May 1946, vol. LXXXIII No. 5. Published by A. R. Harding Publishing Co., 174 E. Long St., Columbus 15, Ohio, page 29 of advertisement by Helin Tackle Co., Flatfish.